(No Model.)
M. F. LARSH.
HAND SCREW CLAMP.
No. 534,164. Patented Feb. 12, 1895.
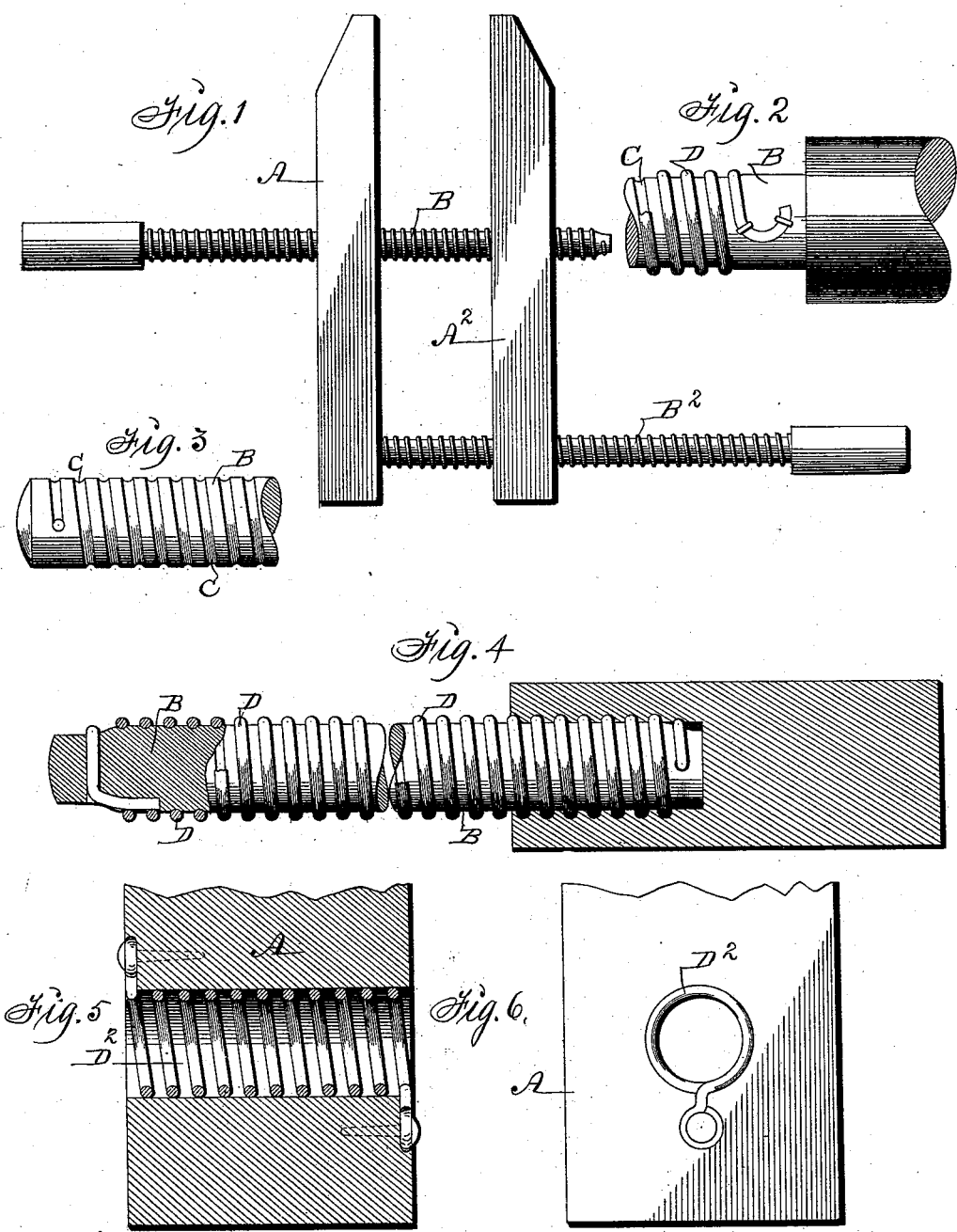

UNITED STATES PATENT OFFICE.

MIRENUS F. LARSH, OF DES MOINES, IOWA.

HAND SCREW-CLAMP.

SPECIFICATION forming part of Letters Patent No. 534,164, dated February 12, 1895.

Application filed July 20, 1894. Serial No. 518,086. (No model.)

*To all whom it may concern:*

Be it known that I, MIRENUS F. LARSH, a citizen of the United States of America, residing at Des Moines, in the county of Polk and State of Iowa, have invented a new and useful Improvement in Hand Screw-Clamps, of which the following is a specification.

My invention consists in providing a female screw in a wooden jaw in such a manner that the thread will be fast at its ends only and the intermediate portion free to yield to the pressure of the male thread that enters so that the breaking of threads incident to the contact and pressure of the mating threads will be prevented.

In the accompanying drawings—Figure 1 is a view of a wooden hand screw clamp provided with metal threads. Fig. 2 is an enlarged view of the large or top end portion of a wooden screw and metal thread thereon, and Fig. 3 is a corresponding view of the lower or small end thereof prepared for fixing a metal thread upon it. Fig. 4 is a view showing the large top end or handle of a screw detachably connected with the metal-threaded end of a wooden screw. Fig. 5 is a sectional view and Fig. 6 a face view of a portion of a wooden jaw having a bore threaded with metal to adapt it to be used as a screw seat or fulcral screw in a hand clamp.

The letters A and A² are used to designate the mating parallel wooden jaws of a hand clamp, and, B and B², two screws connected therewith as required for practical use.

C represents a spiral groove formed in the surface of the portion of the wood that is to be provided with a metal thread. D is a wire, preferably made of brass, wound upon the wood and within the spiral groove C and its ends fixed to the wood, as required to produce a fixed metal thread upon the wood. The ends of the wire may be inserted in a transverse bore in the wood, or embedded in grooves or cavities in the wood, and fastened securely by means of nails, screws, or staples in any suitable way so that they will be within the inner diameter of the wire coils or threads.

The wire-threaded bore or fulcral screw, shown in Figs. 5 and 6, is readily formed by inserting a coiled wire, D², in a bore of the same diameter and then fastening the ends of the wire in cavities formed in the faces of the wood, by means of nails as shown, or in any suitable way as required to fix the wire thread securely in the bore formed in the wood in such a manner that the coils will yield and adjust themselves to the male threads of the screw that is fitted to enter the bore.

It is obvious that both male and female screw threads can be thus readily fixed to wood for all the practical purposes for which wooden screws have heretofore been used.

It is also obvious that wooden screws that have been damaged by the breaking away of portions of their wooden threads can be readily repaired by removing the wooden threads entirely and fixing wire or metal threads thereto in the manner set forth and the loss incident to worn out wooden screws thereby obviated.

I claim as my invention—

An improved screw clamp consisting of two mating jaws having transverse bores and coiled wires fitted in said bores and fastened at their end portions, and two mating wooden screws having wire coils fixed thereto to serve as screw-threads when in engagement with the wire coils in said bores, substantially as and for the purposes stated.

MIRENUS F. LARSH.

Witnesses:
HERBERT E. POAGE,
THOMAS G. ORWIG.